UNITED STATES PATENT OFFICE.

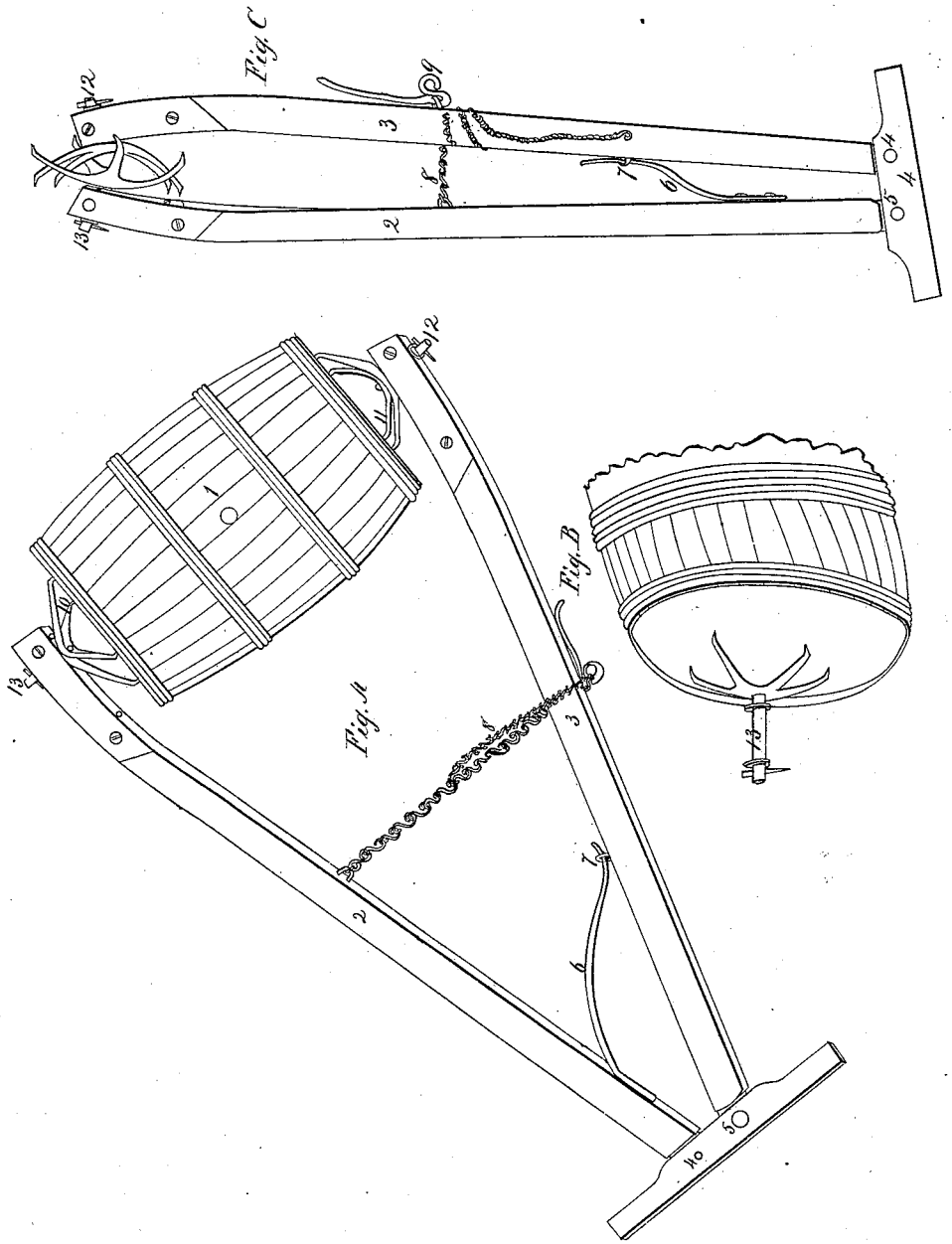

SERVETUS LONGLEY, OF CINCINNATI, OHIO.

APPARATUS FOR ROLLING AND HANDLING BARRELS, &c.

Specification of Letters Patent No. 15,042, dated June 3, 1856.

*To all whom it may concern:*

Be it known that I, SERVETUS LONGLEY, of the city of Cincinnati, in the county of Hamilton and State of Ohio, have invented certain new and useful Improvements in Apparatus for Rolling and Handling Merchandise; and I do hereby declare that the following is a full and exact description of the same, reference being had to the accompanying drawings, forming part of this specification, and to the letters and figures of reference marked thereon.

Similar figures refer to like parts of the improvement.

In the shipment of goods in large as well as small lots, when taken in the aggregate, a large amount of re-handling is necessary in shifting the packages, hogsheads, barrels and bales while loading or unloading the different conveyances used for their transportation. This is usually done by the most laborious process by hand, and more power is really exerted and brought into action in this way than would perform double the labor required, where a little mechanical aid and skill are brought into use for the same purpose; and the aim and object of my improvement is, to save labor time and money, by the use of a simple contrivance for the easy and expeditious handling and shifting or rolling of goods from place to place, it being adapted for barrels, hogsheads, bales, boxes and like packages for mechandise.

My improvement consists of a combination of two levers, acted upon by a spring the tendency of which is, to bring the lower ends of said levers together and clasp the heads of the barrel or hogshead; and upon the said lower ends of the levers are placed wrists, on each of which wrists is placed a three or four pointed clutch, working free upon the wrists, between slight collars, and said points being sharpened enter the heads of the barrel, and the operator then secures the levers in this position by a chain and hook connecting them, and the upper ends of levers being united by and working on a bolt, and also provided with a handle, the operator is enabled to roll or handle parcels of all kinds with twice the ease, and half the time usually employed.

To enable others skilled in the art to make and use my improvement I will proceed to describe its construction and operation by referring direct to the accompanying drawings forming part of this specification.

Similar figures refer to like parts.

Figure A is a top and perspective view of the improvement, and is supposed to be applied to use, ready for the operator to roll the barrel 1, as seen in the drawing.

1 represents the barrel.

2 and 3 are the curved levers or side pieces; lever 2 being fastened by a pin or bolt to handle 4 and lever 3 working freely at its joint on the handle upon a wrist or bolt 5.

6 is a spring, its lower end secured to lever 2 and the other end running through the hasp 7 fastened to the inside of lever 3; its tendency is to bring the levers together.

8 is a chain secured to a hasp or lever 2, and passes up through the cam attachment 9, and when the barrel is clasped by the clutches 10 and 11, the loose end of the chain is hooked into one of the links tightly, and the cam attachment is turned by its handle over toward the barrel, which further brings the levers toward each other and thereby presses the points of clutches 10 and 11 into the heads of the barrel and keep them so.

12 and 13 are the wrists passing through the ends of the levers and also through the center of clutches 10 and 11 which work freely upon the wrists and the said wrists are provided with washers as seen in Fig. A and also pins on the outside of the levers to keep them in their places.

Fig. B, is a perspective side and end elevation of the clutch and wrist, with its attachments, disconnected from the lever, and represented in its application to a hogshead, a section of which is shown only.

Fig. C, is a vertical elevation of the improved apparatus, represented as closed when not required for use and occupies but little space.

The construction of the several parts of the improvement are made substantially as shown in the drawings and, the apparatus is brought into action by separating the clutch ends of levers 2 and 3 until they pass the chine of the barrel or hogshead or until they clear the two ends of the body desired to be rolled or shifted, when the levers are left free, and the spring 6 brings the clutches, 10 and 11 tight against the ends of the barrel or package, after which the chain 8 passing through the cam attachment 9 is linked into a hook on the same chain, and the lever on attachment 9 is pushed over toward the barrel, which brings the levers nearer together and presses the points of the clutches into the heads of the barrel, and the clutches working free on wrists 12 and 13, the operator lifts the handle 4 and rolls the hogshead or barrel by pulling or pushing on the handle 4 as occasion may require.

What I claim as my improvement and desire to secure by Letters Patent, is—

The levers 2 and 3, in combination with spring 6, chain 8, cam attachment 9, clutches 10 and 11, working freely upon wrists, and the handle 4, all substantially as described and for purposes set forth in the foregoing specifications.

SERVETUS LONGLEY.

Witnesses:
L. W. SMITH,
NICHOLAS BIRD.